(12) United States Patent
Kwak et al.

(10) Patent No.: US 9,459,833 B2
(45) Date of Patent: Oct. 4, 2016

(54) SYSTEM AND METHOD WITH SPECIFIC ORDERED EXECUTION OVER PHYSICAL ELEMENTS

(71) Applicant: Maxim Integrated Products, Inc., San Jose, CA (US)

(72) Inventors: Sung Ung Kwak, Frisco, TX (US); Donald Wood Loomis, III, Coppell, TX (US); Edward Tangkwai Ma, Plano, TX (US); Robert Michael Muchsel, Addison, TX (US); Pirooz Parvarandeh, Los Altos Hills, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 358 days.

(21) Appl. No.: 13/925,684

(22) Filed: Jun. 24, 2013

(65) Prior Publication Data
US 2014/0095564 A1    Apr. 3, 2014

Related U.S. Application Data

(60) Provisional application No. 61/707,792, filed on Sep. 28, 2012.

(51) Int. Cl.
*G06F 7/58* (2006.01)
*H04L 9/08* (2006.01)
*H04L 9/06* (2006.01)

(52) U.S. Cl.
CPC .......... *G06F 7/588* (2013.01); *H04L 9/0662* (2013.01); *H04L 9/0866* (2013.01)

(58) Field of Classification Search
None
See application file for complete search history.

(56) References Cited

U.S. PATENT DOCUMENTS

| | | | | |
|---|---|---|---|---|
| 5,789,950 | A * | 8/1998 | Nakagawa | 327/105 |
| 6,795,843 | B1 * | 9/2004 | Groe | 708/801 |
| 2002/0186069 | A1 * | 12/2002 | Hochschild | 327/337 |
| 2004/0012053 | A1 * | 1/2004 | Zhang | 257/390 |

* cited by examiner

*Primary Examiner* — Michael D Yaary
(74) *Attorney, Agent, or Firm* — North Weber & Baugh LLP

(57) ABSTRACT

The invention relates to semiconductor devices, and more particularly, to systems, devices and methods of utilizing inherent differences among physical elements in an electrical component to generate unique and non-duplicable numbers that are statistically random and repeatable. These bits may be applied as identifications, random number seeds or encryption keys in many security applications, e.g., a financial terminal. An integrator is coupled to a plurality of physical elements, selects two physical elements or element sets, and generates an integrated difference signal according to a difference between these two physical elements or element sets. A comparison-decision logic further determines whether the difference between the selected two physical elements is associated with a bit of "1" or "0". In some embodiments, a multi-bit number constitutes multiple bits each of which may be derived from a difference between two randomly selected physical elements or element sets.

20 Claims, 10 Drawing Sheets

100

400

450

1000

SYSTEM AND METHOD WITH SPECIFIC ORDERED EXECUTION OVER PHYSICAL ELEMENTS

CROSS REFERENCE TO RELATED APPLICATION

The application claims the benefit under 35 U.S.C. §119 (e) of Provisional Application Ser. No. 61/707,792, entitled "System and Method with Specific Ordered Execution over Physical Elements," filed on Sep. 28, 2012, the subject matter of which is incorporated herein by reference in its entirety.

BACKGROUND

A. Technical Field

The present invention relates to semiconductor devices, and more particularly, to systems, devices and methods of utilizing inherent differences among physical elements in an electrical component to generate unique and non-duplicable numbers that are repeatable and statistically random. These numbers may be applied as identifications, random number seeds or encryption keys in many security applications including trusted transactions in a financial terminal.

B. Background of the Invention

In many security applications, an electronic component is preferred to be associated with a unique number that is physically uncloneable. This unique number may be used as an identification to track this electronic component, a cryptographic key to encrypt and decrypt sensitive information, or a random number seed to generate the cryptographic key. These secure features require the unique number to be not only statistically random and non-predictable from one component to the next, but also stable and preferably immune to noise, temperature drift and other disturbances. Moreover, the unique number is normally permanent, i.e., repeatable over time and invariant across power cycles. When used for security purposes, a physical structure embedded with the unique number is preferred to be deeply buried within the component, and may not be discerned by visual inspection under a microscope or by electromagnetic emission measurement. Such a highly-confidential unique number is critical to provide an enhanced level of security in the security applications, and particularly, for a secure microcontroller embedded in a financial terminal.

The unique number is normally provided by fuses, one-time programmable (OTP) memory arrays or static random-access memory (SRAM) in most of the existing security applications. Simple metallic or polysilicon resistive fuses are coupled to a breakdown circuit that may deliver an excessive current, such that the unique number is burnt into the fuses according to user specification. The OTP memory arrays incorporate fuses and anti-fuses based on capacitors or transistors within a conventional complementary metal-oxide-semiconductor (CMOS) technology. Unique numbers may be programmed to these OTP fuses and anti-fuses prior to the first time use. The SRAM is a conventional semiconductor memory based on bi-stable latching circuit, and hereby, is used to store the unique number. The prior art solutions are normally expensive, and in some cases, have to rely on non-standard manufacturing processes to enable special structures, e.g., a floating gate, for the purpose of storage and programmability.

One of those skilled in the art may conveniently recover the unique number from a security application that is based on any of the above solutions. The fuses and the OTP memory arrays may be visually inspected under a microscope, and the bits of "1" and "0" may be discerned. Regardless of its power status, the SRAM may be directly coupled out by a circuit in a tamper attempt, and as a result, the confidential information stored in the SRAM is easily intercepted. In addition to its high cost, the prior art solutions are vulnerable to tampering attacks that are increasingly sophisticated. Therefore, a less expensive and more secure solution is needed to generate unique, non-duplicable, statistically random and repeatable numbers that may be used as component identification, cryptographic keys, or seeds for random number generation in many security applications.

SUMMARY OF THE INVENTION

Various embodiments of the present invention relate to semiconductor devices, and more particularly, to systems, devices and methods of utilizing inherent differences among physical elements in an electrical component to generate unique and non-duplicable numbers that are repeatable and statistically random. These numbers may be applied as identifications, random number seeds or encryption keys in many security applications including trusted transactions in a financial terminal.

One aspect of the invention is a number generator that is based on a plurality of physical elements. The number generator further comprises an integrator and a comparison-decision logic. The integrator is coupled to the plurality of physical elements, selects two physical elements, and generates an integrated difference signal according to a difference between these two physical elements. The comparison-decision logic is coupled to the integrator and further determines whether the difference between the selected two physical elements is associated with a bit of "1" or "0".

In another aspect of the invention, the bit may also be generated based on a difference between two element sets, each comprising more than one physical element selected from the plurality of physical elements. In accordance, a multi-bit number constitutes multiple bits, and each bit is derived from a difference between two physical elements or two element sets randomly selected from the plurality of physical elements.

One aspect of the invention is a method of generating a bit of "1" or "0" based on a plurality of physical elements. Two sets of physical elements are selected from the plurality of physical elements in which every two physical elements are associated with an inherent difference due to non-uniformity and imprecision of a manufacturing process. A difference between the two selected sets of physical element is amplified to generate an integrated difference signal. Upon amplification, the difference between the two selected sets of physical elements is determined to be associated with a bit of "1" or "0".

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not

DETAILED DESCRIPTION OF THE PREFERRED EMBODIMENTS

Figure 1:
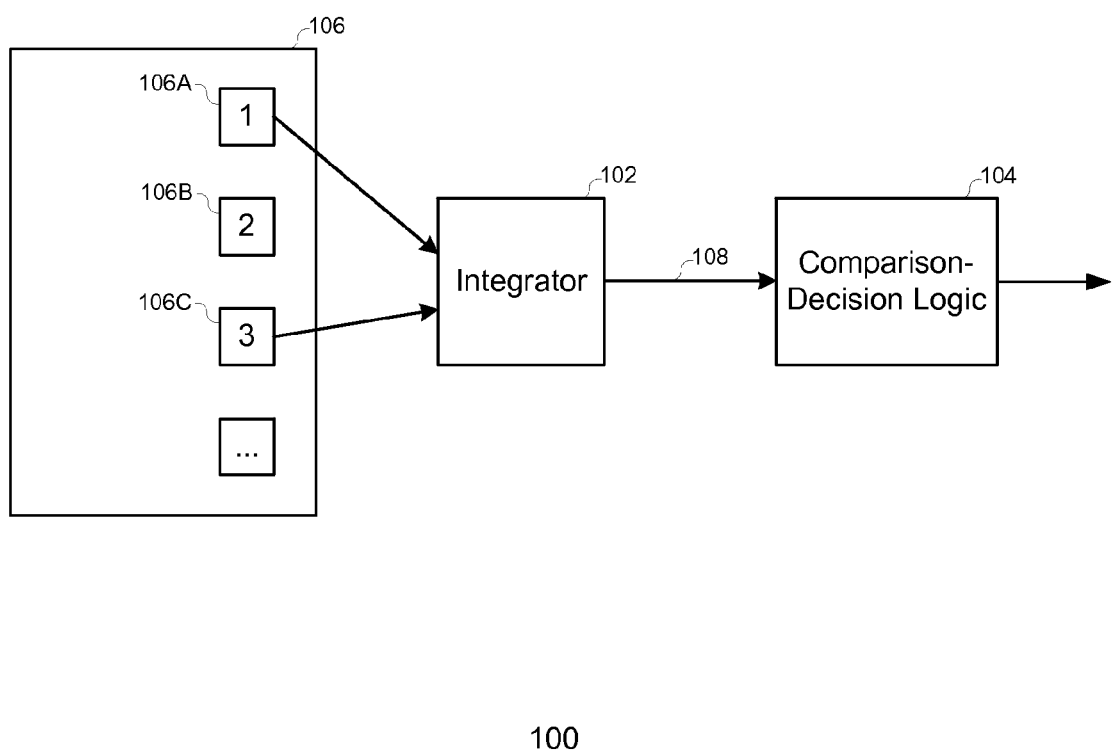
FIG. 1 illustrates an exemplary block diagram of a number generator based on a plurality of physical elements according to various embodiments of the invention.

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments of the invention relate to physical elements, and more particularly, to systems, devices and methods of utilizing inherent differences among physical elements in an electrical component to generate unique, non-duplicable, statistically random and repeatable bits. To obtain such a bit value, a small difference between two physical elements can be amplified to generate a signal until the signal is sufficiently large for reliable interpretation as a known "0" or "1" value. These bits may further act as one bit in a serial number that is used as an identification (ID) number of the corresponding component, a random number seed or a cryptographic key to meet the security needs in many security applications.

Regardless of how well semiconductor processes are managed, subtle physical differences are unavoidable among semiconductor devices in a single die and among semiconductor dies located at different locations across a wafer. These differences originate from non-uniformity and small imprecisions in lithography and wafer processing steps, even though the devices or dies are intended to be identical. When the physical elements are manufactured from semiconductor processing, they may be placed at different physical locations or oriented differently, and local semiconductor process characteristics are not entirely consistent for these physical elements. As a result, each physical element demonstrates its specificity for its electrical, mechanical, magnetic, chemical and other properties.

The differences are statistically random and very small. There may be small measurable gradients across the wafer in more than one direction, and very small differences exist in capacitance, speed, or temperature sensitivity from one transistor to the next. For instance, two otherwise identical capacitors might differ by 0.1% in capacitance due to difference in dielectric thickness and plate area. The former may be caused by variation in a dielectric formation step, while the latter results from variations in lithography or etching. Semiconductor design normally strives to minimize these differences such that performance of the end product is controlled within a certain tolerance. However, the differences are utilized here to generate statistically random numbers that are unique, non-duplicable and repeatable.

Number/Bit Generation Using Two Physical Elements

FIG. 1 illustrates an exemplary block diagram 100 of a number generator based on a plurality of physical elements according to various embodiments of the invention. The number generator 100 further comprises an integrator (or accumulator) 102 and a comparison-decision logic 104 in addition to the plurality of physical elements 106. The plurality of physical elements 106 includes at least two physical elements 106A-106C. The integrator 102 is coupled to the plurality of physical elements 106, selects two physical elements 106A and 106C, and amplifies a difference between physical elements 106A and 106C to an integrated difference signal 108. In particular, the difference is amplified over time. The integrated difference signal 108 is further compared to a reference, e.g., zero or ground, by the comparison-decision logic to determine whether the difference between the selected two physical elements 106A and 106C is associated with a bit of "1" or "0".

In various embodiments of the invention, the physical elements 106A-106C are selected from different structures that are available as a result of a CMOS manufacturing process. These structures include, but are not limited to, resistors, capacitors, inductors, and transistors. These physical elements 106A-106C are laid out as identical to each other on a mask set that defines their physical dimensions. Although it is statistically indeterminable whether a physical property of one physical element is larger or smaller than another physical element, an inherent difference exists between any two physical elements due to process variation in the manufacturing process. Variations in lithography, material deposition and etching processes are all potential factors that may ultimately impact uniformity of related physical element properties across a semiconductor wafer and among different wafers. Generally, no two physical elements are identical, and their inherent difference may be discerned by appropriate means.

The number generator 100 may be protected under a security mesh. In some embodiments, the security mesh is monolithically made of a number of poly-silicon layers and/or metal layers that are sequentially manufacturing above an integrated circuit (IC) substrate where the transistors used in the integrator 102, the logic 104 and the physical elements 106 are located. However, in certain embodiments, the silicon die that contains the number generator 100 is capped by another silicon die that integrates a security mesh. An attacker has to probe through the security mesh to tamper the number generator 100, and an additional level of security is provided to the related security applications besides randomness of the output number.

Figure 2A:
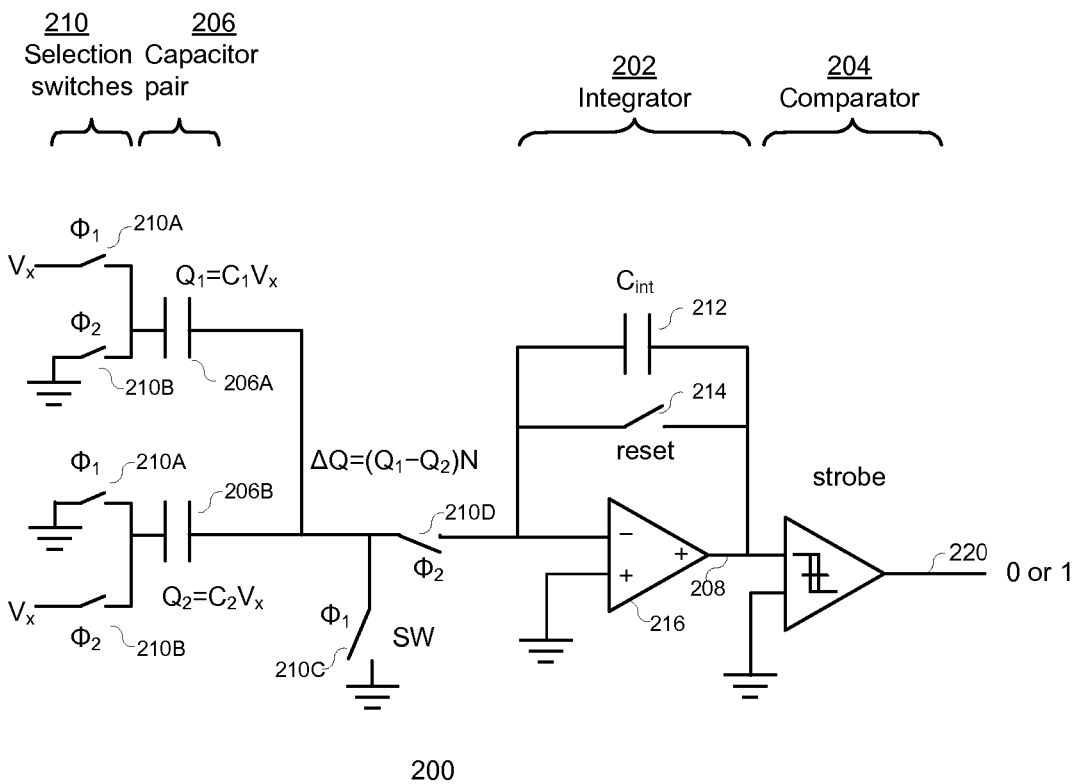
FIG. 2A illustrates an exemplary block diagram of a single-bit number generator based on capacitive elements according to various embodiments of the invention.

FIG. 2A illustrates an exemplary block diagram 200 of a single-bit number generator based on capacitive elements according to various embodiments of the invention. The number generator 200 is a specific embodiment of the number generator 100, and is used to generate one random bit. The number generator 200 further comprises an integrator (or accumulator) 202, a comparison-decision logic 204 and a plurality of switches 210 in addition to the capacitive elements 206.

Two capacitors 206A and 206B are selected from a plurality of capacitive elements and coupled to generate an output bit 220. Capacitors made of polysilicon are normally controlled precisely without significant differences. However, those made of CMOS devices may demonstrate reasonably large differences and are good candidates for the capacitive elements 206.

The integrator 202 is implemented as a differential operational amplifier (op-amp) integrator that comprises an integration capacitor 212, a reset switch 214 and an op-amp 216. The integrator 202 amplifies a capacitance difference between the capacitors 206A and 206B. Prior to amplification, the reset switch 214 is initially enabled to reset charges on the integration capacitor 212 to zero. The switches 210, grouped into two sets, are subsequently controlled to couple the capacitors 206A and 206B to the integrator 102. The integrator 202 accumulates a charge difference from alternating sampling and integration steps that are based on the capacitors 206A and 206B, respectively. Since the alternating steps average out high frequency circuit noises, an integrated difference signal 208 is generated at the output of the integrator 202 in association with an amplified difference between the capacitors 206A and 206B, while high signal quality is obtained with suppressed noises.

The integrated difference signal 208 is further digitized to generate the output bit by the comparison-decision logic 204. When it is compared to a reference, e.g., zero or ground, the integrated difference signal 208 is associated with "1" as physical element 206A has a larger capacitance, and "0" as physical element 206B has a larger capacitance. In certain embodiments, the reference may be offset from the ground to incorporate all system errors arising from the switches 210 and 214, capacitor 212, op-amp 216 and the logic 204.

Figure 2B:
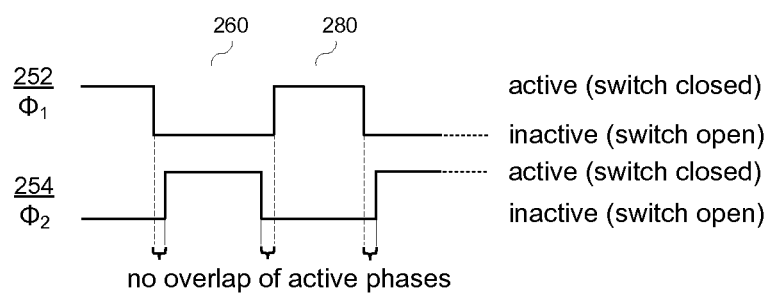
FIG. 2B illustrates an exemplary time diagram of two non-overlapping phase signals that control alternating sampling and integration processes according to various embodiments of the invention.

FIG. 2B illustrates an exemplary time diagram 250 of two non-overlapping phase signals that control alternating sampling and integration processes according to various embodiments of the invention. When a particular pair of capacitors is selected for comparison, their associated selection switches toggle between "open" and "closed" states. When a capacitor is not selected, its selection switches remain un-toggled (for example, grounded). Within a first sampling duration 260, a first phase signal $\Phi_1$ enables a first set of switches 210A and 210C among switches 210, and couples the capacitive element 206A between a bias voltage $V_X$ and the ground. The capacitor 206A is decoupled for the integrator 202. A total charge of $Q_1$ is stored on the integration capacitor 212. Likewise, in subsequent integration duration 280, a second phase signal $\Phi_2$ enables a second set of switches 210B and 210D among switches 210, and couples the capacitive element 206B between the bias voltage $V_X$ and the integrator 202. Among the stored charge $Q_1$, a total charge of $Q_2$ is held by the second capacitor, and a charge of $Q_1$-$Q_2$ is redistributed to the integration capacitor 212. These two durations 260 and 280 never overlap, such that the sampling and integration steps are separated to avoid errors. The resulting integrated difference signal 208 is substantially at a level of $(Q_1-Q_2)/C_{INT}$ after one above cycle, and may be further enhanced to a desirable level as multiple cycles of sampling and integration are implemented.

In one embodiment, the integrator 202 and the comparison-decision logic 204 owns intrinsic hysteresis to counteract meta-stability of the physical elements 206. Meta-stability occurs when two selected physical elements have a difference that is unresolvable. It rarely happens, and however, when it occurs, the temperature, supply voltage and properties of the devices 202 and 204 would determine the output bit rather than lithography and processing variation related to the physical elements 206.

Figure 3:
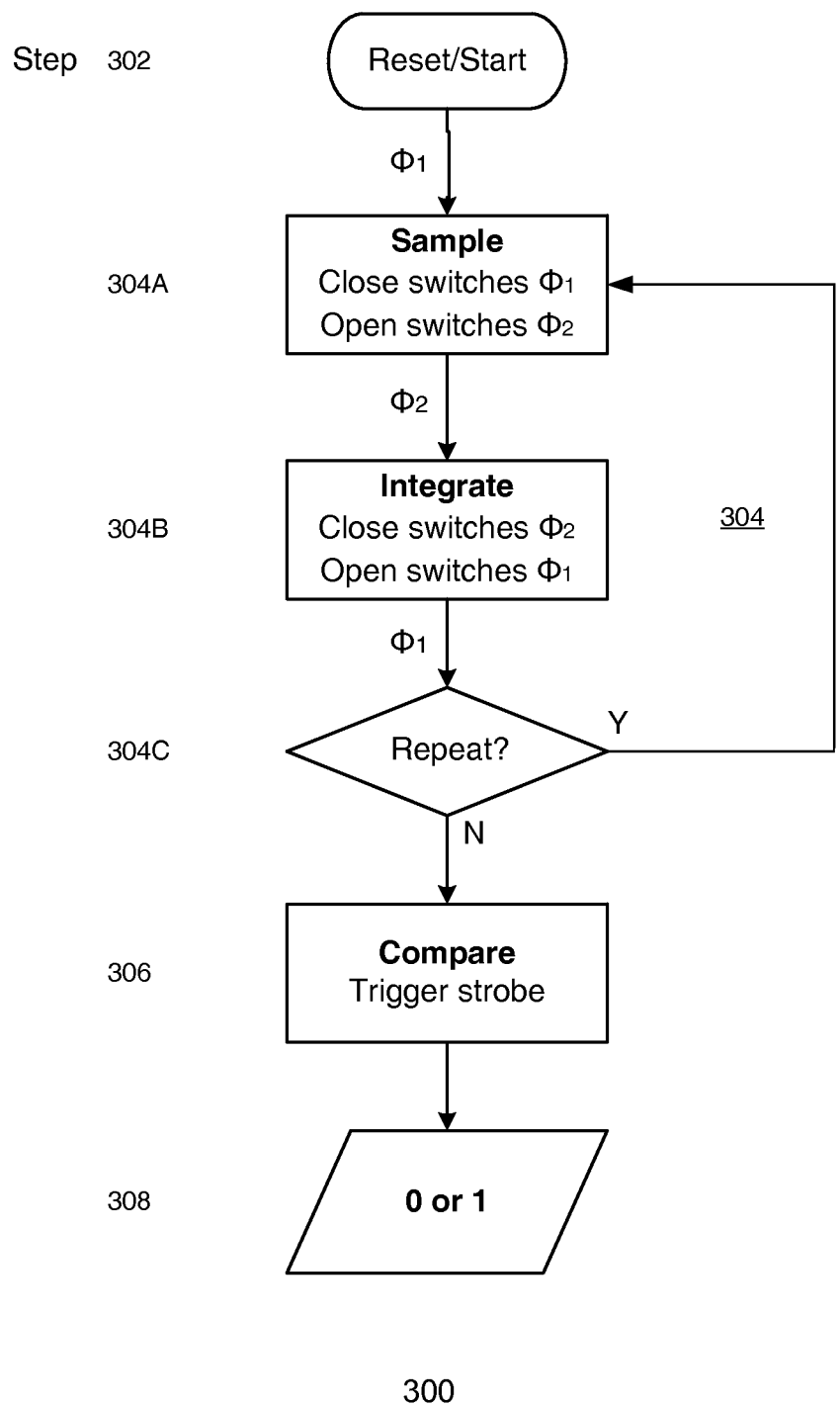
FIG. 3 illustrates an exemplary flow chart of a method with ordered execution for single bit generation according to various embodiments of the invention.

FIG. 3 illustrates an exemplary flow chart 300 of a method with ordered execution for single bit generation according to various embodiments of the invention. Single bit generation starts with resetting an integrator or accumulator at step 302. In one embodiment, an integration capacitor is involved, and thus, charge existing on the capacitor is fully discharged.

At step 304, a sampling phase and an integration phase are sequentially implemented and repeated until an integrated difference signal reaches a desirable voltage level. In the sampling phase 304A, a first phase signal $\Phi_1$ enables a first set of switches, and allows integration over a first physical element. In the subsequent integration phase 304B, a second phase signal $\Phi_2$ enables a second set of switches, and couples a second physical element to the integrator to offset the previous integration over the first physical element. The sampling and integration phases may alternate for multiple cycles until stopped at step 304C. As a result of repeated sampling and integration cycles, the integrated difference signal reaches a cumulative voltage of $\Delta V$.

In some embodiments, the physical elements are capacitors, and the integrator is based on charging an integration capacitor as illustrated in FIG. 2A. In the sampling phase 304A, the first set of switches 210A and 210C are closed to connect a first capacitor 206A and a second capacitor 206B to a predetermined voltage level $V_X$ and ground, respectively, while both capacitors are disconnected from the integrator 212. In the integration phase 304B, the second set of switches 210B and 210D are closed, and the first set of switches 210A are opened. The first capacitor 206A is grounded, and the second capacitor is biased between the voltage level $V_X$ and the integrator 202. Subsequent to one sampling and integration phase, charge of $Q_1-Q_2$ is accumulated on the integration capacitor 212. The sampling and integration phases may be repeated for multiple times, e.g., N, such that a certain charge of $\Delta Q$ is accumulated on the integration capacitor 212 within the integrator 202. This charge of $\Delta Q$ is associated with the integrated difference signal $\Delta V$ by the capacitance of the integration capacitor 212.

At step 306, a comparison operation is triggered to compare the integrated difference signal with a reference. At step 308, the comparison result is associated with a digital bit of "1" or "0". Therefore, the bits of "1" and "0" are respectively related to two directions of a difference between the first and second physical elements. In view of the entire ordered execution 300, the output bit is influenced by the time durations of the phase signals $\Phi_1$ and $\Phi_2$, the physical elements selected, and the sensitivity and comparison.

Multi-Bit Number Generation

Figure 4A:
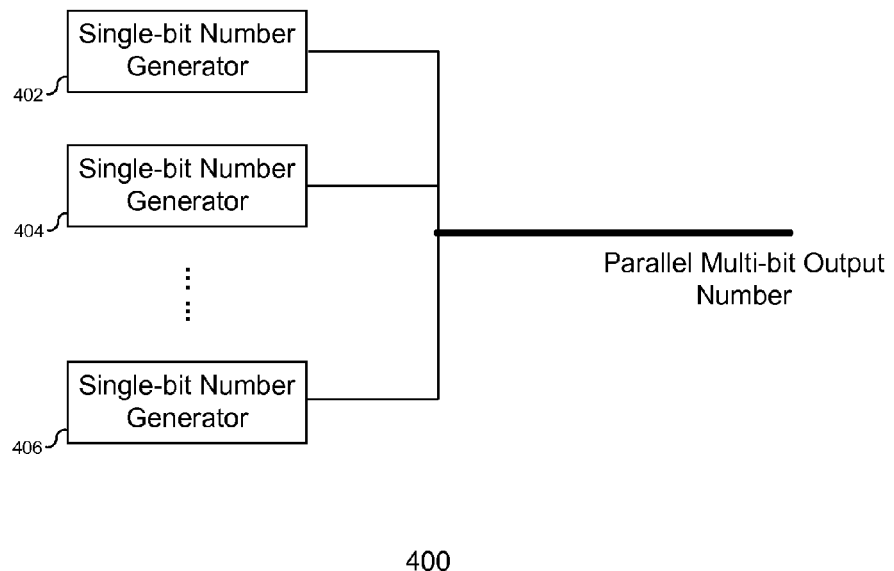
FIG. 4A illustrates an exemplary block diagram and of a multi-bit number generator based on a parallel configuration according to various embodiments of the invention.
Figure 4B:
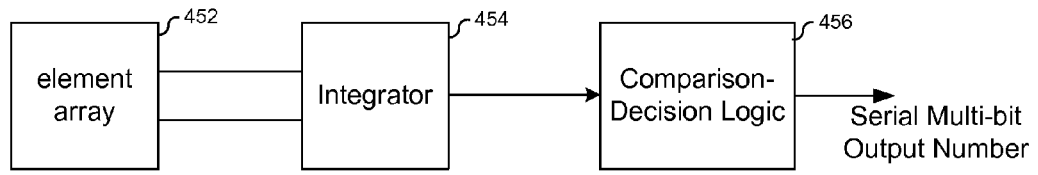
FIG. 4B illustrates another exemplary block diagram and of a multi-bit number generator based on a serial configuration according to various embodiments of the invention.

FIG. 4A and FIG. 4B illustrates a block diagram 400 and 450 of a multi-bit number generator based on a parallel configuration and a serial configuration, respectively, according to various embodiments of the invention. In the number generator 400, single-bit number generators 402-406 are arranged and controlled in parallel to provide parallel bits as a multi-bit output number. Each single-bit number generator is associated with a separate physical element array, a separate integrator and separate comparison-decision logic.

In contrast, the number generator 450 comprises an element array 452, an integrator 454 and comparison-decision logic 456. Despite its use for multi-bit number generation, the number generator 450 substantially adopts an identical structure as the single-bit number generator 100, except that multiple bits within the output number are generated sequentially from the comparison-decision logic 456. For each bit, two physical elements are selected from the physical element array 452, and the difference between these two physical elements is cumulated and amplified by the integrator 454 prior to being extracted as a digital output bit. As a result, multiple bits are time-multiplexed within the serial multi-bit output number. Such number generation in a serial configuration compromises processing time for efficient chip estate, because one set of integrator and comparison-decision logic 456 may be used to generate all bits in the serial multi-bit output number.

Permutation of Physical Elements

Figure 5:
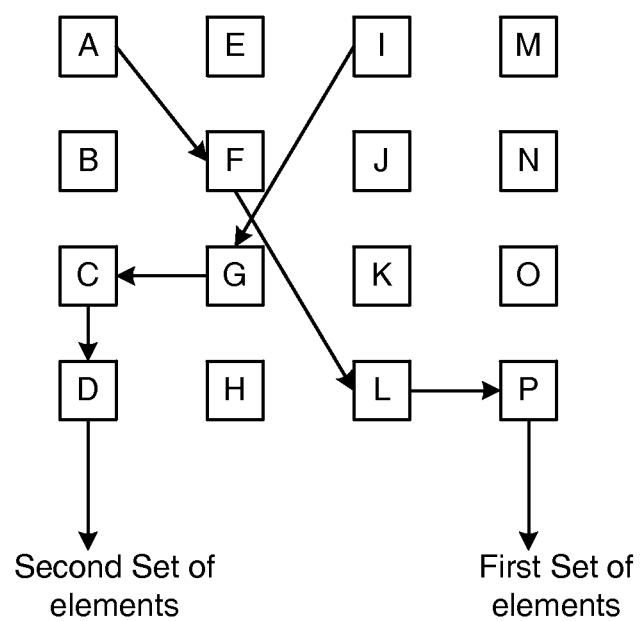
FIG. 5 illustrates an exemplary combination of two sets of physical elements selected for number generation according to various embodiments of the invention.

FIG. 5 illustrates an exemplary combination of two sets of physical elements selected for number generation according to various embodiments of the invention. A difference used for number generation is not limited between two single physical elements; rather, a difference between any two sets of physical elements may be applied for the same purpose. This multi-element configuration is normally adopted when specificity of a single physical element is not sufficient. In this embodiment, an array of physical elements 500 comprises sixteen seemingly identical physical elements, and every two of them are not entirely identical due to process variation. A first set of physical elements includes physical elements A, F, L and P among the array 500, while a second set of physical elements includes physical elements I, G, C and D. The difference between the first and second sets is utilized to generate one output bit.

The first and second sets of physical elements may be arranged according to a parallel configuration or a serial configuration. In the parallel configuration, the corresponding four physical elements in each set are coupled in parallel for signal amplification during both sampling phases 260 and integration phases 280. In the serial configuration, the corresponding four physical elements in each set are coupled sequentially for signal amplification during each single phase 260 or 280. However, in some embodiments, the four physical elements in the first and second set may be coupled sequentially for signal amplification during consecutive sampling or integration phases, respectively.

Regardless of the configuration, combination of physical elements allows efficient number generation. The number of unique bits that can be derived from the physical element array 500 is enhanced by varying the combination of physical elements within each set of physical elements. As a result, with one set of integrator and comparison-decision logic, more information bits may be generated in an economical fashion.

To maximize options of information bits, it is desirable to use all possible permutations within a physical element array. Suppose that the physical element array consists of n physical elements, and k physical elements in this physical element array may be used for each sampling or integration phase. The total permutation for k physical elements is $N!/(N-k)!$. In one embodiment, the physical element array comprises four physical elements, including physical elements A, B, C and D. Two physical elements are used for number generation based on 12 possible permutations, (AB), (AC), (AD), (BA), (BC), (BD), (CA), (CB), (CD), (DA), (DB), and (DC). A system that needs 1024 bits of information would therefore need a physical element array that comprises at least 33 physical elements, when two physical elements are used. It is obvious that the number n of physical elements in the physical element array may be drastically reduced when k is increased. For example, when using triplets of physical features (k=3), a physical element array including 12 physical elements is sufficient to provide 1024 bits of information. Such operation enables additional combination and permutations of physical elements and lowers area requirement for the physical element array, because a single physical element may be used in various combinations and permutations.

Physical Element Selection

Figure 6A:
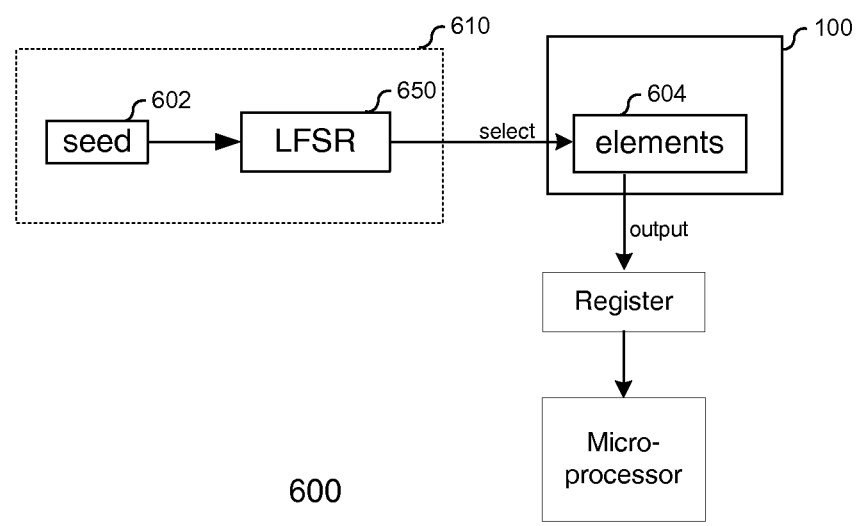
FIG. 6A illustrates an exemplary block diagram of a secure system that relies on seeds to select physical elements in an element array according to various embodiments of the invention.
Figure 6B:
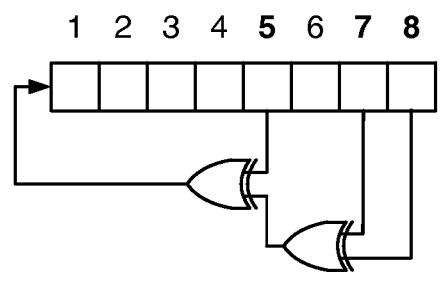
FIG. 6B illustrates an exemplary block diagram of a linear feedback shift register (LFSR) that is used in a secure system for element selection according to various embodiments of the invention.

FIG. 6A illustrates an exemplary block diagram 600 of a secure system that relies on seeds to select a set of physical elements in a physical element array according to various embodiments of the invention, and FIG. 6B illustrates an exemplary block diagram 650 of a linear feedback shift register (LFSR) that is used in the secure system for sequential physical element selection according to various embodiments of the invention. In physical element permutations, interconnection between all possible permutations of physical elements may become difficult to implement in hardware. Moreover, the selection mechanism would preferable be realized in a non-obvious, non-monotonic fashion to increase security and make the system harder to observe. In particular, a physical element selection block 610, e.g., the LFSR 650 coupled with a seed 602, may be used to generate a number for selecting a physical element which is further used for number generation. The LFSR 650 may be conveniently realized in hardware with very little circuitry e.g., XOR or XNOR.

The LFSR 650 uses the seed 602 as an initial value, and generates a stream of values that may be used to select a set of physical elements from an element array 604. The LFSR 650 sequentially generates a finite number of values, and eventually enters a repeating cycle. Each value in the stream is completely determined by its current (or previous) state. However, the stream of values may appear random and contain many values, when the LFSR 650 is arranged with a well-chosen feedback function. A maximum length n-bit LFSR 650 produces $2^n-1$ values before the value starts to repeat. The exemplary LFSR 650 in FIG. 6B is an 8-bit LFSR.

Taps are arranged in the LFSR 650 for a specific feedback in finite field arithmetic based on a polynomial modulo 2 (i.e., the coefficients of the polynomial must be 1s or 0s). In this particular embodiment in FIG. 6B, the feedback polynomial for the LFSR 650 is $x^8+x^7+x^5+1$, since the taps are coupled at the $5^{th}$, $7^{th}$, and $8^{th}$ bits.

The LFSR's initial condition, as defined by the seed 602, determines the physical elements selected from the physical element array 604 for number generation. The seed 602 may be stored in fuses, one-time-programmable (OTP) memory or other types of memory, such that it is either fixed when it is manufactured out of a factory, or programmed by means of software or hardware mechanisms after a user receives a device. In certain embodiments, multiple seeds may be available for determine a variable set of physical elements for number generation. By choosing different seeds, various output bits may be generated as at least one multi-bit output number at the output of the number generator 100. In a cryptographic application, variable output numbers may be used as varying encryption keys to enhance the security level.

Figure 6C:
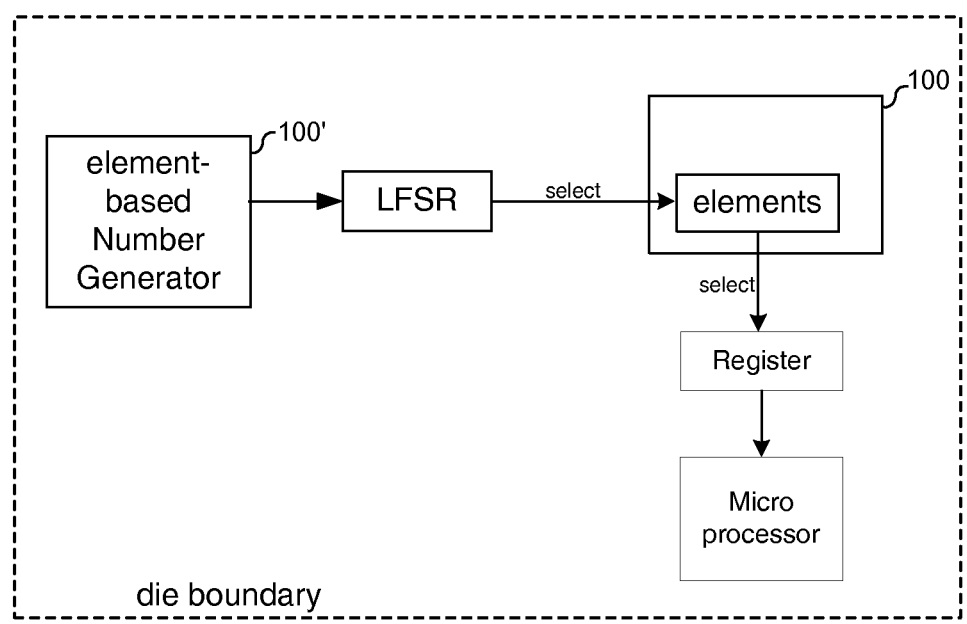
FIG. 6C illustrates an exemplary block diagram of a secure system that relies on another element-based number generator to provide seeds for selecting physical elements in an element array according to various embodiments of the invention.

FIG. 6C illustrates an exemplary block diagram 680 of a secure system that relies on another physical element-based number generator 100' to provide seeds for selecting physical elements in a physical element array according to various embodiments of the invention. Even though it rarely occurs, there still remains slight possibility that two physical elements or element sets have an unresolvable difference. To counteract this possibility, a second physical element-based number generator 100' may be used to generate the seed 602. A second physical element array 604' in the second number generator 100' is oriented differently from the first physical element array 604, or placed at a distance from the first physical element array 604.

In another embodiment, the output number from the number generator 100' based on the second physical element array may also be used to modify the polynomial of the LSFR 650 that is used to select physical element or element sets in the first physical element array 604.

A Sequential Mode

A difference between two physical elements or two element sets may be extracted in a sequential mode in which each bit is processed in two sequential periods rather than in alternating sampling and integration phases. In the first step of the sequence, a first physical element or element set is coupled for accumulation. In one embodiment, charge stored in a first capacitor is repeatedly added or accumulated. In the second step of the sequence, a second physical element or element set is coupled for subtraction, and in one embodiment, charge stored via the first capacitor is repeatedly drained via a second capacitor. Care needs to be taken not to saturate the integrator and comparison-decision logic, and in particular, only a limited number of accumulation and subtraction rounds are allowed in each step. In the third step of the sequence, the result is evaluated, and one method is to compare the resulting voltage to the ground for determining the output bit.

Generation of one bit is associated with one accumulation period followed by one subtraction period in the sequential mode. In contrast with an alternating mode presented above, the accumulation and subtraction periods consolidate multiple sampling and integration phases, respectively. In multi-bit number generation, sequential accumulation and subtraction periods are associated with various bits, and the bits are randomized as the physical elements used in the periods vary accordingly.

Figure 7:
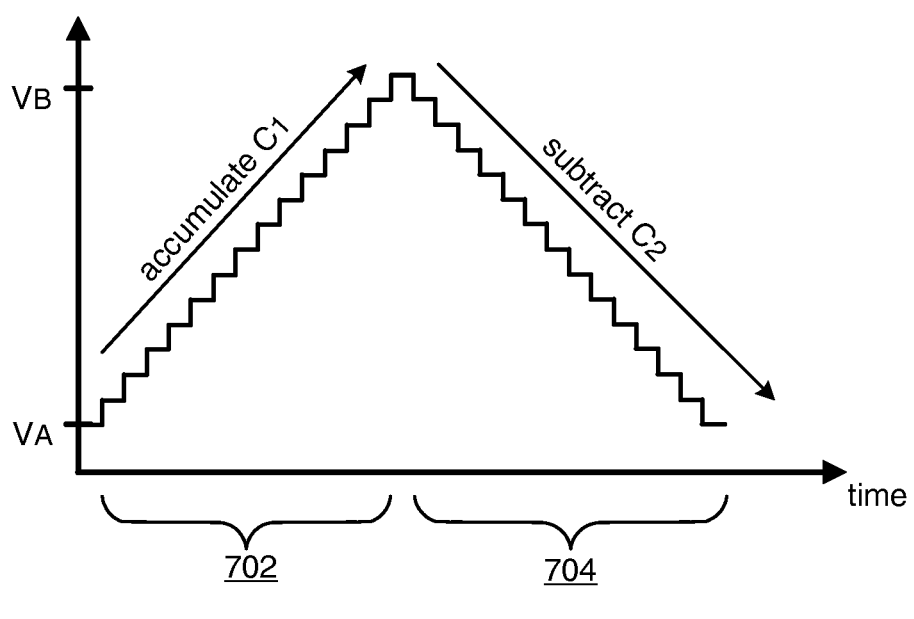
FIG. 7 illustrates an exemplary time diagram of an integrated difference signal generated in a sequential mode according to various embodiments in the invention.

FIG. 7 illustrates an exemplary time diagram 700 of an integrated difference signal in a sequential mode according to various embodiments of the invention. Operation in the sequential mode is associated with fixed threshold values $V_A$ and $V_B$. The numbers of accumulation and subtraction rounds are respectively counted during each accumulation and subtraction period during which time durations these two threshold values, $V_A$ and $V_B$ are reached. In the first step 702, charge on a first physical element or element set is repeatedly accumulated from a first threshold voltage $V_A$ until a second threshold voltage $V_B$ is reached. In one embodiment, the threshold voltages $V_A$ and $V_B$ are respectively set at ground and +2V. The number of accumulation rounds X is used as first input into the comparison-decision logic. In the second step 704, a second physical element or element set is used to discharge from the threshold voltage $V_B$ until the first threshold voltage $V_A$ is reached. The number of subtraction rounds Y is used as a second input into the comparison-decision logic. In a third step, the number of accumulation round X is compared to the number of subtraction round Y.

Self Calibration

The number generator 200 may be plagued with charge feed-through from the switches 210, and particularly, switch 210E. During each sampling phase or accumulation period, the switch 210E is toggled on, and the integrator 202 accumulates this charge feed-through. However, during the subsequent integration phase or subtraction period, the switch 210E is toggled off. As a result, the charge feed-through via the switch 210E is coupled to the integrated difference signal and the output bit, and sometimes, it may dominate over the difference between two physical elements or element sets, resulting in a non-repeatable and temperature-dependent output bit.

Figure 8:
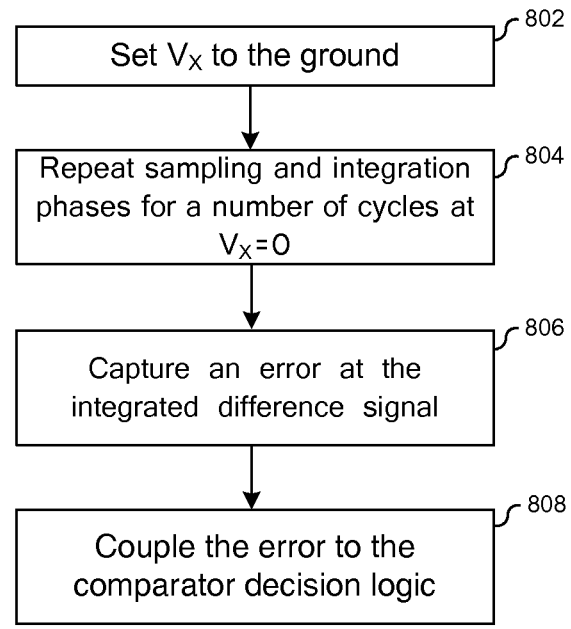
FIG. 8 illustrates an exemplary flow chart of a self-calibration method that may be applied prior to number generation according to various embodiments in the invention.

FIG. 8 illustrates an exemplary flow chart 800 of a self-calibration method that may be applied prior to number generation according to various embodiments in the invention. At step 802, the bias voltage $V_X$ is temporarily set to the ground. The difference between two selected physical elements or element sets is not amplified during sampling and integration phases. At step 804, the original sampling and integration phases are repeated for a number of cycles when the bias voltage $V_X$ remains at the ground. At step 806, an error from charge feed-though via switch 210E is captured and amplified by the integrated difference signal at the output of the integrator 202. At step 808, the error from charge feed-through is coupled as the reference to the comparison-decision logic 204 for correcting the output bit. The bias voltage $V_X$ is stored to the predetermined level for number generation. Likewise, in the sequential mode, the accumulation and integration periods may be implemented under $V_X=0$ in order to compensate the errors from charge feed-through.

Enhanced Systems for Security Applications

Figure 9:
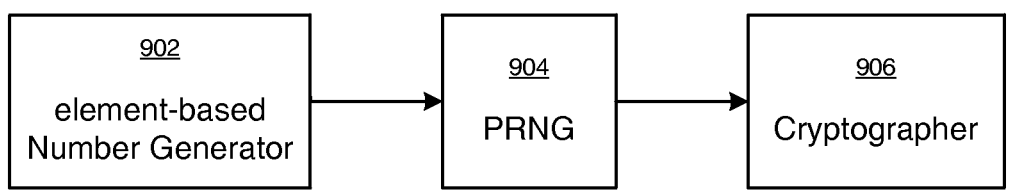
FIG. 9 illustrates an exemplary block diagram of a key generation system based on physical elements according to various embodiments of the invention.

FIG. 9 illustrates an exemplary block diagram 900 of a key generation system based on physical elements according to various embodiments of the invention. The key generation system 900 comprises an element-based number generator 902, a pseudo random number generator (PRNG) 904, and a cryptographer 906. The PRNG 904 uses an output number provided from the number generator 902 as a seed to generate a random number. The random number is used as a cryptographic key by the cryptographer 906.

The number generator 902 is based on physical elements. As physical elements are used for generating a cryptographic key, an attacker may endeavor to examine a stolen device to recover the key using software or circuit probes. Despite low possibility of success, self destruction of the number generator 100 is preferred to ensure security of a device. Upon detection of a tamper attempt, permanently disabling either the integrator 202 or the comparison-decision logic 204 may suffice to destruct the number generator 200. For practical purposes, physical elements in the number generator 100 may also be destroyed. In some embodiments, the bias voltage $V_X$ may be raised beyond an acceptable tolerance, causing breakdown and destruction of the dielectrics sandwiched within the capacitive element. The enhanced bias voltage $V_X$ should be generated internally, and particularly, enabled upon detection of any tamper attempt.

Figure 10:
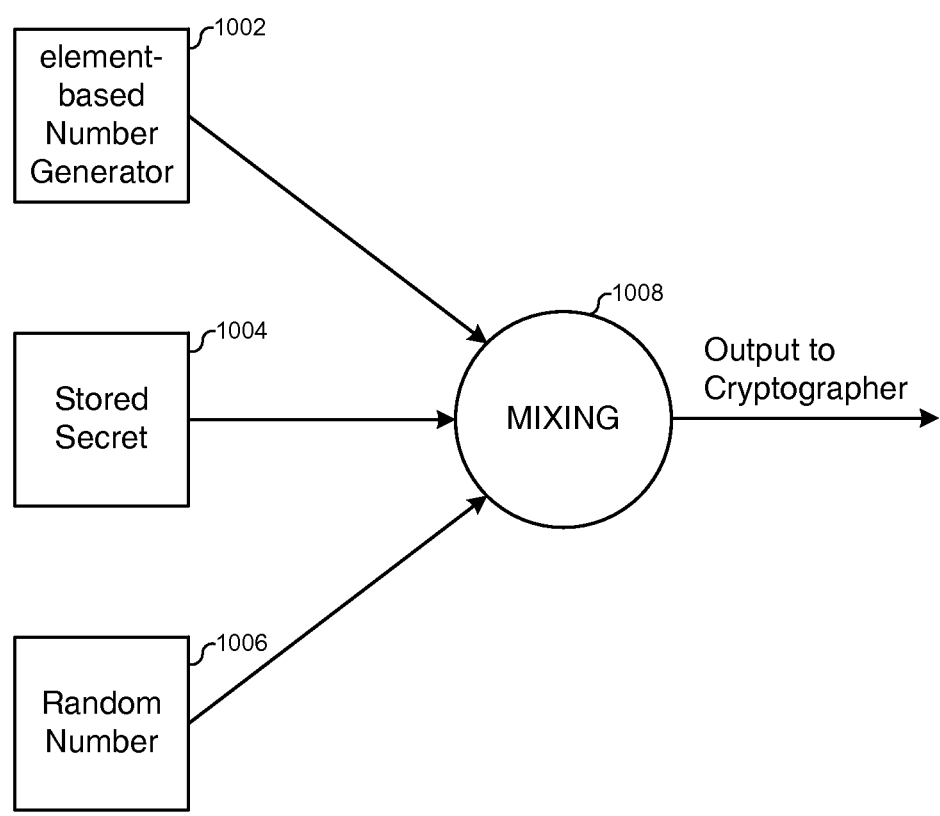
FIG. 10 illustrates an exemplary method of enhancing a security level of cryptography according to various embodiments of the invention.

FIG. 10 illustrates an exemplary method 1000 of enhancing a security level of cryptography according to various embodiments of the invention. A number generator 1002 is based on physical elements, and provides a first data. A user secret 1004 is stored as a second data in a memory, such as a battery-backed memory. A random number generator 1006 generates a third data, and one example of such a generator is based on thermal noise. The first, second and third data are mixed by a mixing circuit 1008, such that a highly secure output is generated and provided to subsequent cryptographic function as a cryptographic key.

One of those skilled in the art will see that a physical element-based number generator may replace conventional number storage resources including fuses, OTP memory and nonvolatile memory. The physical elements appear physically identical and statistically random, so it is impossible to duplicate. Moreover, once manufactured, the physical elements may reliably provide stable and repeatable random numbers for various semiconductor components. The random numbers generated by the physical elements demonstrate a high level of randomness, and are particularly suitable for use as unique IDs, random number seeds, and encryption keys in security applications. It is difficult for an attacker to reverse-engineer the contents and tamper the random numbers. Compared with the conventional resources, the physical element-based number generator occupies a smaller chip estate, demands no special processing, and thus, shows enhanced cost efficiency.

It will be appreciated to those skilled in the art that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It is, therefore, intended that the claims in the future non-provisional application will include all such modifications, permutation and equivalents as fall within the true spirit and scope of the present invention.

We claim:

1. A number generator, comprising:
   a plurality of physical elements in which every two physical elements are associated with an inherent difference due to non-uniformity and imprecision of a manufacturing process;
   an integrator, coupled to the plurality of physical elements, the integrator uses a selection circuit to select two sets of physical elements from the plurality of physical elements, amplifying over time a difference between the two selected sets of physical elements and generating a first integrated difference signal; and
   a comparison-decision logic, coupled to the integrator, the comparison-decision logic determining whether the difference between the two selected sets of physical elements is associated with a first bit of "1" or "0".

2. The number generator according to claim 1, wherein each of the plurality of physical elements is made of a capacitor, and the integrator is implemented based on a differential operational amplifier and an integration capacitor to integrate the difference between two selected sets of capacitors during alternating sampling and integration durations.

3. The number generator according to claim 1, wherein the integrator alternates between sampling phases and integration phases, and during every consecutive sampling and integration phases, a first selected set of physical elements and a second selected set of physical elements of the two selected sets of physical elements are sequentially coupled with the integrator for the purposes of enabling and offsetting an integration during the course of amplifying the difference in the integrator.

4. The number generator according to claim 1, wherein the integrator selects another two sets of physical elements, amplifies over time a difference between these two selected sets of physical elements and generates a second integrated difference signal that is further used to determine a second bit of "1" or "0", the first bit and the second bit being sequentially generated at the output of the number generator and time-multiplexed as part of a multi-bit output number.

5. The number generator according to claim 1, wherein the physical elements in at least one of the two selected sets of physical elements are sequentially selected by a linear feedback shift register (LFSR) and coupled to the integrator for integration.

6. The number generator according to claim 1, wherein the integrator operates in a sequential mode that comprises two sequential periods, a first number of accumulation rounds being implemented during a first sequential period to couple a first selected set of physical elements and charge the first integrated difference signal from a first threshold voltage to a second threshold voltage, a second number of subtraction rounds being implemented during a second sequential period to couple a second selected set of physical elements and discharge the first integrated difference signal from the second threshold voltage to the first threshold voltage, the difference of the first and second number being used to determine the first bit.

7. The number generator according to claim 1, wherein the first bit is associated with at least one bit of a multi-bit number that comprises a plurality of bits, and a pseudo random number generator (PRNG) uses the multi-bit number as a seed to generate a random number.

8. The number generator according to claim 1, wherein the first bit is associated with at least one bit of a first number that comprises a plurality of bits, and the first number is mixed with at least one of a second number computed based on a user secret and a third number provided by a random number generator, the mixed number being used by a cryptographer to enhance its security level.

9. The number generator according to claim 1, wherein each of the plurality of physical elements is made of a transistor, and the integrator is implemented based on a differential operational amplifier and an integration capacitor to integrate the difference between corresponding threshold voltages of the two selected sets of transistors during alternating sampling and integration durations.

10. A method of generating a bit of "1" or "0" based on a plurality of physical elements, comprising the steps of:
using a selection circuit to select two sets of physical elements from the plurality of physical elements in which every two physical elements are associated with an inherent difference due to non-uniformity and imprecision of a manufacturing process;
amplifying over time a difference between the two selected sets of physical element to generate a first integrated difference signal; and
determining whether the difference between the two selected sets of physical elements is associated with a first bit of "1" or "0".

11. The method according to claim 10, wherein each of the plurality of physical elements is made of a capacitor, and a differential operational amplifier and an integration capacitor are applied together to amplify the difference between two sets of capacitors during alternating sampling and integration durations, during each sampling duration and the subsequent integration duration, a first set of switches and a second set of switches being controlled to couple a first selected set of capacitors and a second selected sets of capacitors with the operational amplifier for charging and discharging the integration capacitor, respectively.

12. The method according to claim 10, wherein the step of amplifying the difference comprises alternating sampling phases and integration phases, and during every consecutive sampling and integration phases, a first selected set of physical elements and a second selected set of physical elements in the two selected sets of physical elements are sequentially coupled for the purposes of enabling and offsetting an integration during the course of amplifying the difference.

13. The method according to claim 10, wherein a first selected set of physical elements and a second selected set of physical elements include an identical number of physical elements, and at least one physical element in the first selected set of physical elements is distinct from the physical elements in the second selected set.

14. The method according to claim 10, wherein the physical elements in either of the two selected sets of physical elements are sequentially selected by a linear feedback shift register (LFSR) and coupled to the integrator for integration.

15. The method according to claim 14, wherein the LFSR relies on another number generator based on physical elements to provide a seed.

16. The method according to claim 10, wherein the step of amplification is implemented in a sequential mode that comprises two sequential periods, a first number of accumulation rounds being implemented during a first sequential period to couple a first selected set of physical elements and charge the first integrated difference signal from a first threshold voltage to a second threshold voltage, a second number of subtraction rounds being implemented during a second sequential period to couple a second selected set of physical elements and discharge the first integrated difference signal from the second threshold voltage to the first threshold voltage, the difference of the first and second number being used to determine the first bit.

17. The method according to claim 10, wherein the first bit is associated with at least one bit of a multi-bit number that comprises a plurality of bits, and a pseudo random number generator (PRNG) uses the multi-bit number as a seed to generate a random number.

18. A number generator, comprising:
a plurality of physical elements that every two physical elements are associated with an inherent difference due to non-uniformity and imprecision of a manufacturing process;
an integrator, coupled to the plurality of physical elements, the integrator uses a selection circuit to select two physical elements from the plurality of physical elements, amplifying over time a difference between the two selected physical elements and generating a first integrated difference signal; and
a comparison-decision logic, coupled to the integrator, the comparison-decision logic determining whether the difference between the two selected physical elements is associated with a first bit of "1" or "0".

19. The number generator according to claim 18, wherein the integrator alternates between sampling phases and integration phases, and during every consecutive sampling and integration phases, a first physical element and a second physical element in the two selected physical elements are sequentially coupled to enable and offset integration, respectively.

20. The number generator according to claim 18, wherein the integrator selects another two physical elements that include at least one different physical element, amplifying over time a difference between these two selected physical elements and generating a second integrated difference signal that is further used to determine a second bit of "1" or "0", the first bit and the second bit being sequentially generated at the output of the number generator and time-multiplexed as part of a multi-bit output number.

* * * * *